United States Patent [19]

Kanemitsu et al.

[11] Patent Number: 5,548,416
[45] Date of Patent: Aug. 20, 1996

[54] INPUT RECEIVING APPARATUS BY USING A FACSIMILE APPARATUS

[75] Inventors: Norio Kanemitsu; Hajime Nonogaki, both of Kawasaki, Japan

[73] Assignee: Fujitsu Limited, Kawasaki, Japan

[21] Appl. No.: 475,183

[22] Filed: Jun. 7, 1995

Related U.S. Application Data

[63] Continuation of Ser. No. 117,836, Sep. 8, 1993, abandoned.

[30] Foreign Application Priority Data

Sep. 9, 1992 [JP] Japan .................................. 4-240668

[51] Int. Cl.⁶ ............................................ H04N 1/32
[52] U.S. Cl. ............................................ 358/470; 358/403
[58] Field of Search ............................. 358/402–403, 358/407, 462, 468, 470; 379/100

[56] References Cited

U.S. PATENT DOCUMENTS 4,893,333  1/1990  Baran et al. ............................ 379/100
5,072,309  12/1991  Brown .................................... 358/403

*Primary Examiner*—Stephen Brinich
*Attorney, Agent, or Firm*—Armstrong, Westerman, Hattori, McLeland & Naughton

[57] ABSTRACT

An input receiving apparatus receives an input such as an order slip transmitted from a facsimile apparatus at a user terminal. The user makes a conversation reservation before the user transmits the image data of the order slip. After the input receiving apparatus receives the image data, the input receiving apparatus switches a connection line from a facsimile receiving apparatus to a facsimile transmitting apparatus within the input receiving apparatus within the same call upon receipt of the conversation reservation signal automatically transmits a switching signal to the facsimile apparatus at the user end and performs a character recognition by extracting a character portion from the image data, thereby preparing a return image data based on the character recognition. When the facsimile apparatus at the user end is ready for receiving the return image data, the input receiving apparatus transmits the return image data. The user confirms his order by observing the return image and then issues a PB signal.

11 Claims, 10 Drawing Sheets

INPUT RECEIVING APPARATUS BY USING A FACSIMILE APPARATUS

This application is a continuation of application Ser. No. 08/117,836 filed Sept. 8, 1993, now abandoned.

BACKGROUND OF THE INVENTION

1. Field of the Invention

The present invention relates to an input receiving apparatus using a facsimile apparatus in response to an image, such as an order slip transmitted from a terminal comprising a facsimile apparatus and also receiving a confirmation from the terminal of the facsimile apparatus. The present invention more particularly relates to a receiving apparatus for an input comprising a facsimile receiving unit, a facsimile transmitting unit, a character recognizing unit for recognizing a character, for example, included in the received image data, a return image forming unit for forming a return image based on the result of the character recognition performed by the character recognizing unit. Thereby, designating at least a transmission and receiving operation, character recognition and preparation for return image in a predetermined order, so that it can receive an input from another terminal comprising a facsimile apparatus and subsequently transmit return information to the facsimile apparatus at the input source.

A facsimile entry system using a facsimile apparatus has recently been used in accordance with a request for an automated data entry system. In accordance with such a request, a high level facsimile entry system including a confirmation of a user identification, for example, a method of charging communication line fees, have been demanded.

2. Description of the Related Art

FIG. 1 shows a conventional receiving apparatus for an input, using a facsimile apparatus and forming a facsimile entry system.

In FIG. 1, the input receiving system comprises a facsimile receiving unit 20, a facsimile transmitting unit 30, a character recognizing unit 60 for recognizing characters included in the received image data, a return image forming unit 90 for forming a return image based on the result of the character recognition performed by the character recognizing unit 60, and a sequence control unit 40 for designating at least a transmission and receiving operation, character recognition and a preparation of a return image is performed in the predetermined sequence, thereby receiving an input from another terminal of the facsimile apparatus and transmitting return information to the facsimile apparatus at the input source.

According to the conventional facsimile entry system, a user inputs an image of an order slip from his facsimile apparatus to a center comprising the receiving apparatus. Then the sequence control unit 40 disconnects a line between the facsimile apparatus from which the image is inputted and the receiving apparatus once.

Next, the sequence control unit 40 issues an instruction for the process in which character recognition 60 recognizes the image of the order slip received from the user and the return image forming unit 90 prepares the return image data based on the result of the recognition.

After the return image data is prepared, the receiving apparatus (center) returns the return image data to the user (or a facsimile apparatus designated by the user) based on the observations of the received image data, the user inform the receiving apparatus of the result (such as a confirmation or approval of the order) by using a PB (push button) tone. Then the receiving apparatus returns the return image data prepared based on the result of the recognition by recognizing the image of the order slip received from the user. As described above, in the conventional facsimile entry system, a line between the facsimile apparatus at the input source and receiving apparatus is disconnected once. Then, the line between them is re-connected.

Therefore, when the receiving apparatus (center) side tries to transmit a return image to the user, the receiving apparatus side has to repeat dialing several times when the line on the user side is busy Consequently, the processes on the receiving apparatus (center) side becomes complicated and the receiving apparatus (center) side has to pay a line charge. Further, the user has to worry about when he can receive the return information by the facsimile entry system.

SUMMARY OF THE INVENTION

An object of the present invention is to provide an input receiving apparatus using a facsimile apparatus for maintaining a line connected by an input from a user, in a connected state, and for receiving the input of the facsimile order slip and return the result which is coded by using the same line. Subsequently, simplifying (a sequence of) the process and transmitting return information to the user within a short period of time, with safety and certainty without causing any error in transmission, provides an improved service to a user.

Another object of the present invention is to provide an input receiving apparatus using the facsimile apparatus whereby the line fee to be charged to the receiving apparatus is decreased, by charging the entire line fee to the user.

According to the present invention, a user transmits image data when he transmits the image data of an order slip to an input receiving apparatus, after he makes a conversation reservation. The center which is an input receiving apparatus performs a character recognition of the image data with a line being connected after it completes receipt of the image data of the order slip and determines the character to be written on the order slip. Based on the character recognition, the receiving apparatus prepares a return image. Simultaneously with the processes of the character recognition of the image data and of the preparation of the return image, the receiving apparatus is switched from the receiving state to the transmitting state and the receiving apparatus waits until the facsimile apparatus on the user side can be set in a state in which the facsimile apparatus on the receiving side can receive the return image through a communication protocol. When the apparatus on the user side is ready for receiving the return image and the preparation of the return image data is completed, the receiving apparatus transmits the return image data.

It is possible for the user to confirm his order by using the PB tone if necessary based on the observation of the return image.

DETAILED DESCRIPTION OF THE PREFERRED EMBODIMENT

Figure 1:
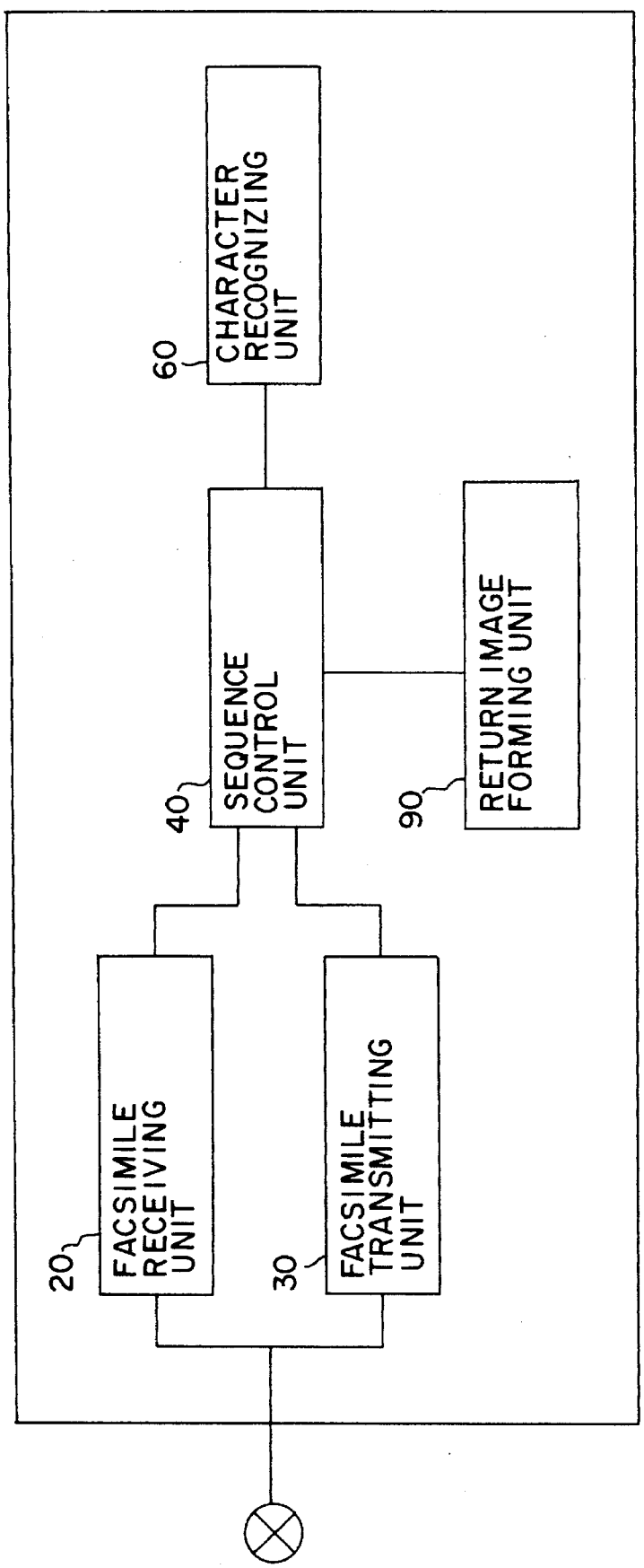
FIG. 1 shows a block diagram of the conventional facsimile receiving apparatus.
Figure 2:
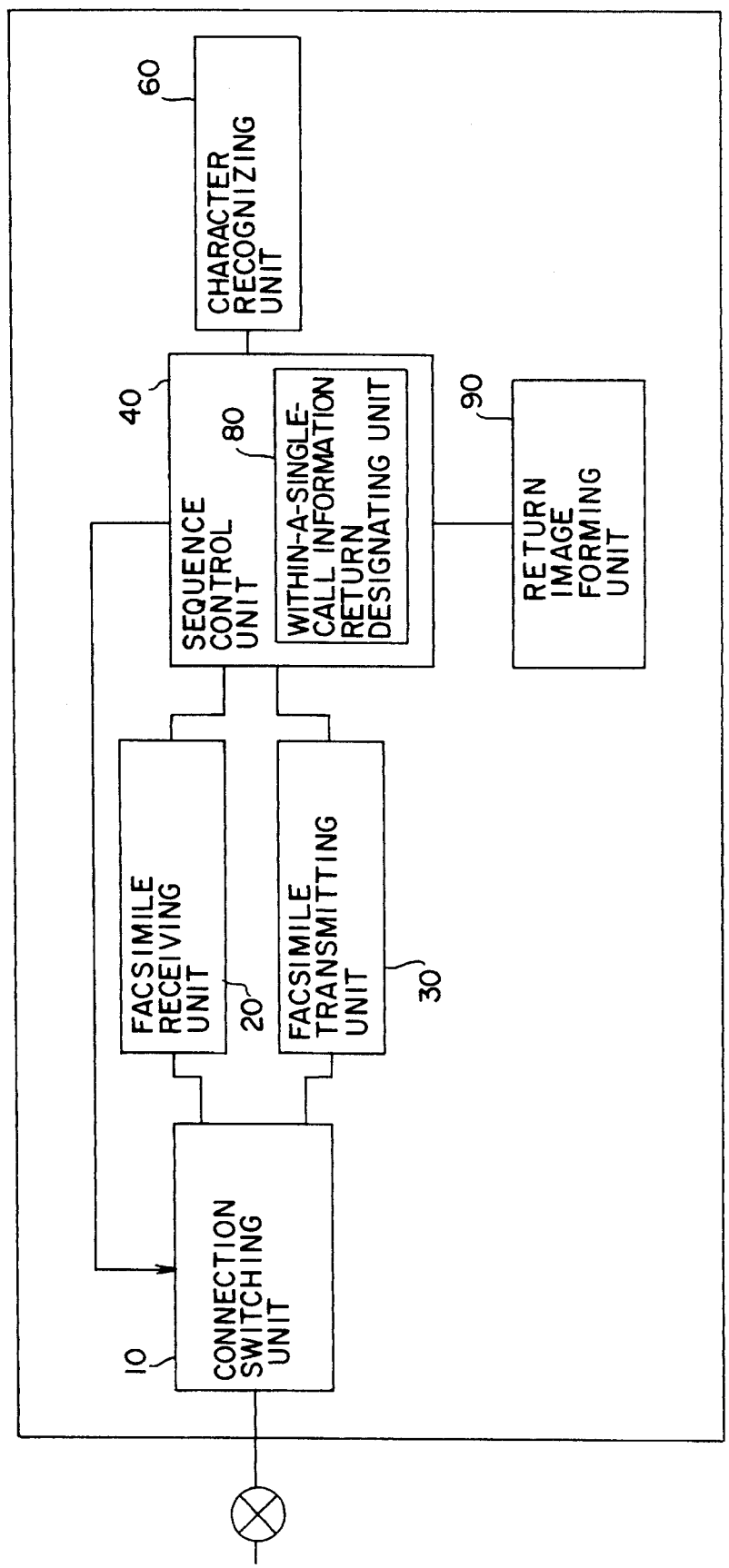
FIG. 2 shows a block diagram representing the principle of the invention.

FIG. 2 shows a block diagram of the principle of the present invention. A receiving apparatus receiving an input from a facsimile apparatus and return information to the facsimile apparatus at the input source comprises; a facsimile receiving unit 20, facsimile transmitting unit 30, character recognizing unit 60 (for performing recognition of a character included in the received image data), return image forming unit 90 (for forming a return image based on the result of the character recognition by the character recognizing unit 60). The facsimile receiving apparatus designates at least the transmitting and receiving operation, a character recognition, and preparation of the return image in a predetermined sequence. Specifically, a receiving apparatus comprises a connection switching unit 10 for switching a line between the facsimile receiving unit 20 and the facsimile transmitting unit 30, maintaining line connection between the receiving apparatus and the facsimile apparatus, at the input source. The within-a-single-call information return designating unit 80 designates the connection switching unit 10 to perform the process of switching the line from the facsimile receiving unit 20 to the facsimile transmitting unit 30, so that the prepared return image can be returned to the facsimile apparatus at the input source, within the same call.

When the user transmits an input to a facsimile apparatus, the receiving apparatus receives the input through the line and the character recognition unit 60 recognizes the content of the input.

It is preferable to receive the input in a determined format so that the character recognizing unit 60 can recognize the content of the input.

A "predetermined format" sometimes requires an image to be input or a designation of reservation of a conversation to have a predetermined format for a frame, column, figure or a character.

Returning image forming unit 90 prepares return images for the facsimile apparatus at the input source, based on the result of the character recognition.

The return image includes information on the receipt of the input and other necessary information. The return image is prepared by inserting the recognition results into the image with the same format as that of the inputted image.

In other words, the image data corresponding to an area to be subject to the character recognition is removed from image data sent from the user. After completion of the character recognition, the image data of the recognition result, such as a character, is inserted in the removed area to provide the return image.

Within-a-single-call information return designating unit 80 switches the connection from the facsimile receiving unit 20 which has received input to the facsimile transmitting unit 30.

The facsimile transmitting unit 30 transmits the return image.

Figure 3:
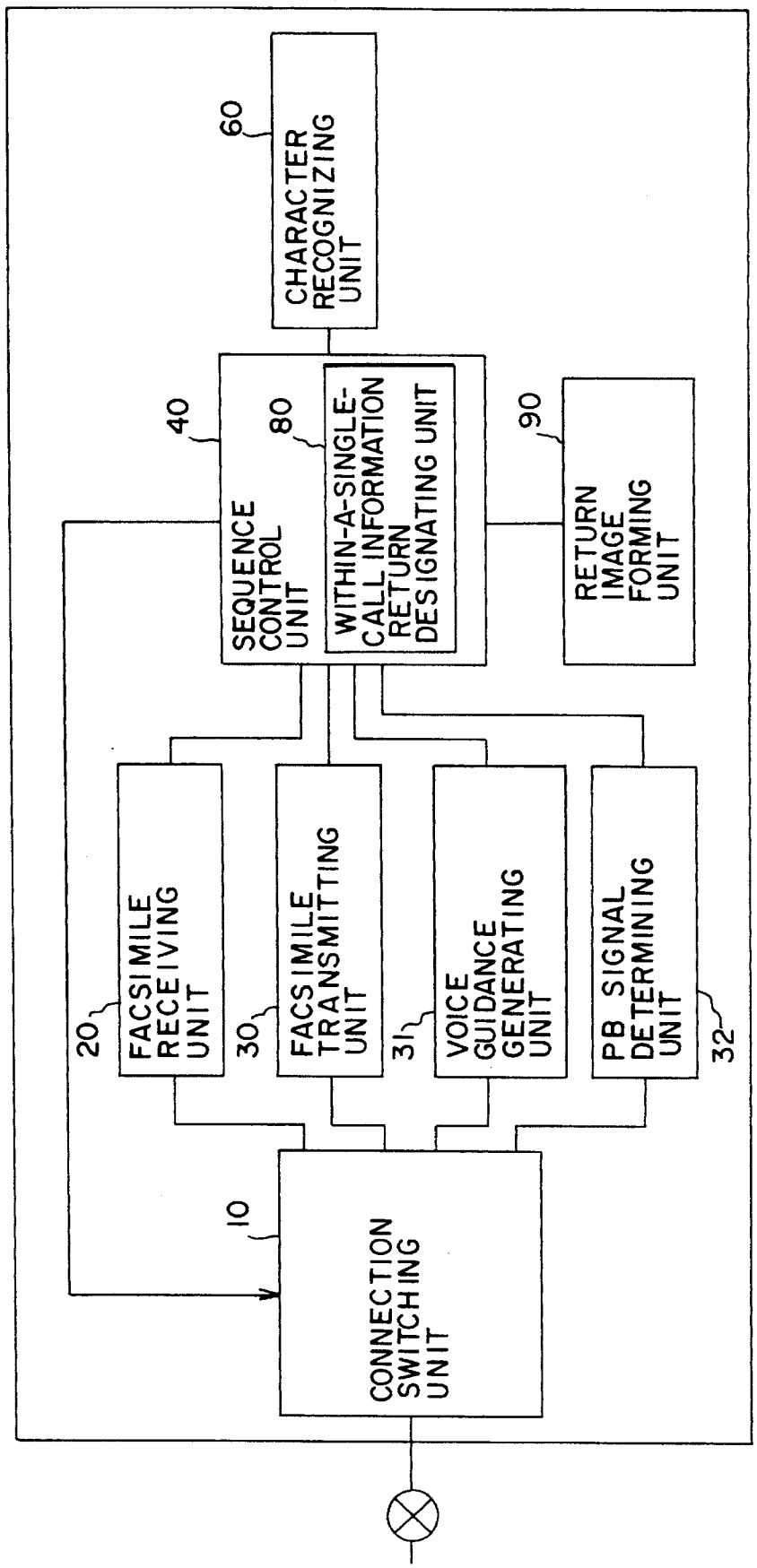
FIG. 3 shows a block diagram of the general structure of an embodiment of the present invention.

FIG. 3 is the second block diagram explaining the present invention. Compared with the first block diagram, additionally provides a voice guidance unit 31 and a PB signal determining unit 32.

The voice guidance unit 31 regenerates voice by synthesizing it from preliminarily entered voice data and transmits the regenerated voice to users via a line. The regenerated voice is used mainly to inform a user of the next action to be undertaken.

The PB signal determining unit 32 determines whether or not the user is authorized by the center by comparing the password entered by the user using a PB signal with the registered password, and outputs a comparison result.

As shown in FIG. 3, the receiving apparatus is also provided with the PB signal determining unit for the received PB signal from the facsimile apparatus at the input source. In response to the transmission of the return image from the receiving unit to the facsimile apparatus within the same call, the return image is transmitted from the receiving apparatus to the facsimile apparatus from which the input image is received.

Therefore, the receiving apparatus can obtain the confirmation from the user and by utilizing the PB signal determining unit obtain the receipt of the input with certainty.

In FIG. 3, the receiving apparatus is also provided with a voice guidance generating unit for producing a voice guidance relating to an input from the PB signal in response to the receiving image when the receiving image is returned from the receiving apparatus; also the voice guidance unit transmits the voice guidance to the facsimile apparatus at the input source. As a result, the user can recognize the meaning of the transmission of the PB signal with certainty and the voice guidance generating unit enhances the confirmation of the user with accuracy. Since the meaning of the PB signal does not need to be notified to the user in advance, it enables the receiving apparatus to obtain confirmation from the users with the various other kinds of contents in accordance with the voice guidance.

Figure 4:
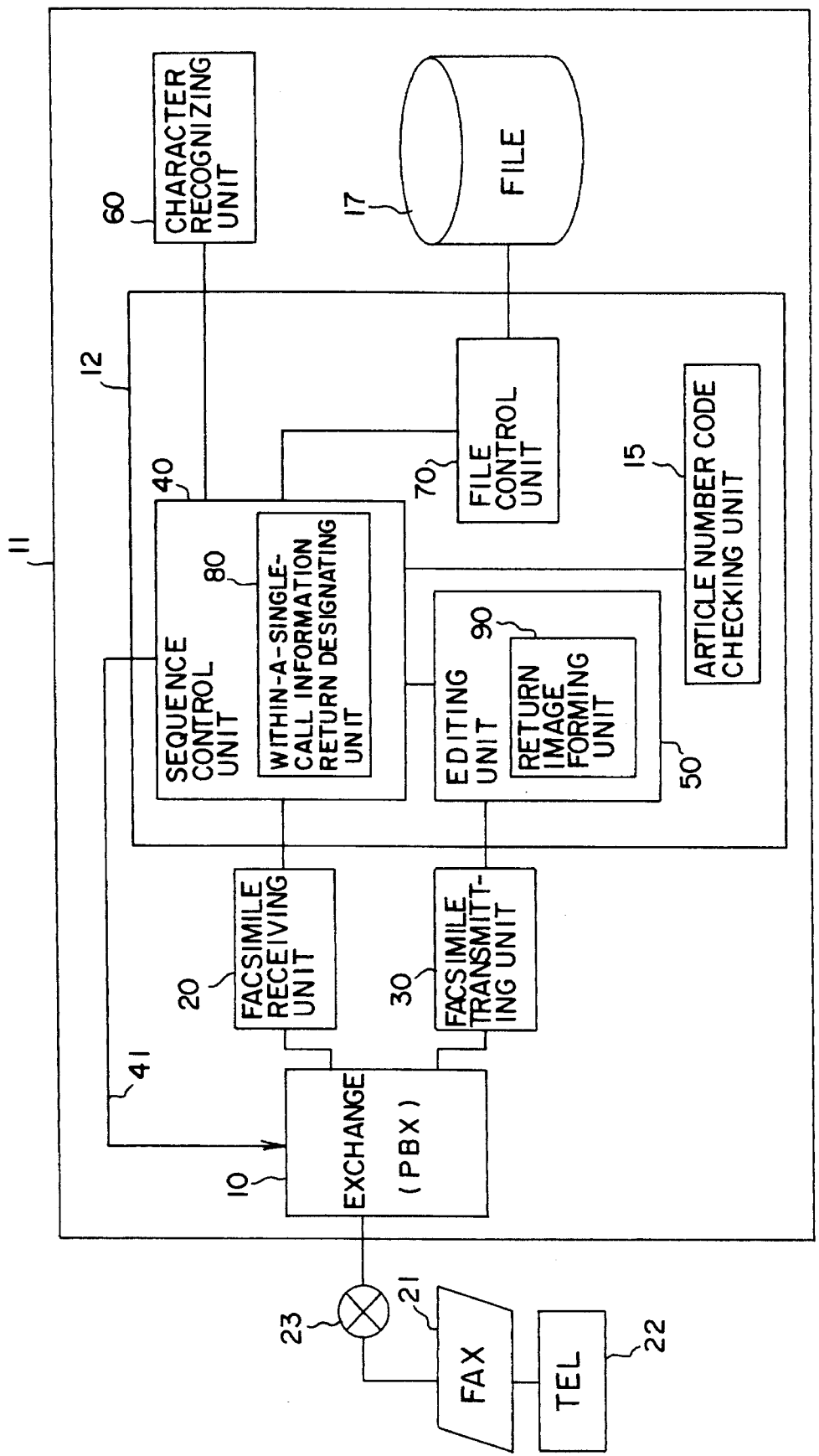
FIG. 4 shows a block diagram according to the first embodiment of the present invention.

FIG. 4 shows an input receiving apparatus using a facsimile apparatus according to an embodiment of the present invention.

As shown in FIG. 4, the receiving apparatus is connected to the facsimile apparatus 21 and telephone 22 through the public line network 23.

The receiving apparatus receives an input (entry) in a predetermined format from the facsimile apparatus and transmits the return information to the facsimile apparatus 21 at the input source. The receiving apparatus comprises a facsimile receiving unit 20; a facsimile transmitting unit 30; a character recognizing unit 60 such as an OCR (optical character reader) for recognizing a character included, for example, in the received image signal; a file 17 for maintaining the received image from the facsimile receiving unit 20 once; an exchange (PBX) 10 corresponding to a connection switching unit, for performing switching between the facsimile receiving unit 20 and facsimile transmitting unit 30 thereby maintaining line connection between the facsimile apparatus 21 at the input source, and the receiving apparatus 11, and a control apparatus 12 comprising a CPU and a memory for performing various controls.

Further, control apparatus 12 comprises: a sequence control unit 40 for designating the transmitting and receiving operation, character recognition, and preparation for a return image in a predetermined sequence; an editing unit 50 for performing editing of the image; an article number code checking unit 15 for performing checks on article codes; and a file control unit 70 for managing the file 17.

The editing unit 50 comprises return image forming unit 90 for forming a return image based on the result of a character recognition by character recognizing unit 60, and the sequence control unit 40 comprises the within-a-single-call information return designating unit 80 for designating the connection switching unit 10 to switch the line to the facsimile transmitting unit 30 and designating the prepared return image through to the facsimile transmitting unit 30.

In addition to an operation of storing the received image, file 17 can store a plurality of image data in advance and enable the image data corresponding to the recognition result of the received image data to be read and to return it as the return image data to the facsimile apparatus 21 at the input source.

For example, where the user wants to obtain a catalog of an article or goods, he transmits the order slip from the facsimile apparatus 21 at the input source. The receiving apparatus side recognizes the contents of the received order slip and when the order slip is judged as being a request for the article catalog, the receiving apparatus side reads the image data corresponding to the article catalog form file 17 and returns it to the facsimile apparatus 21 at the input source.

Figure 5:
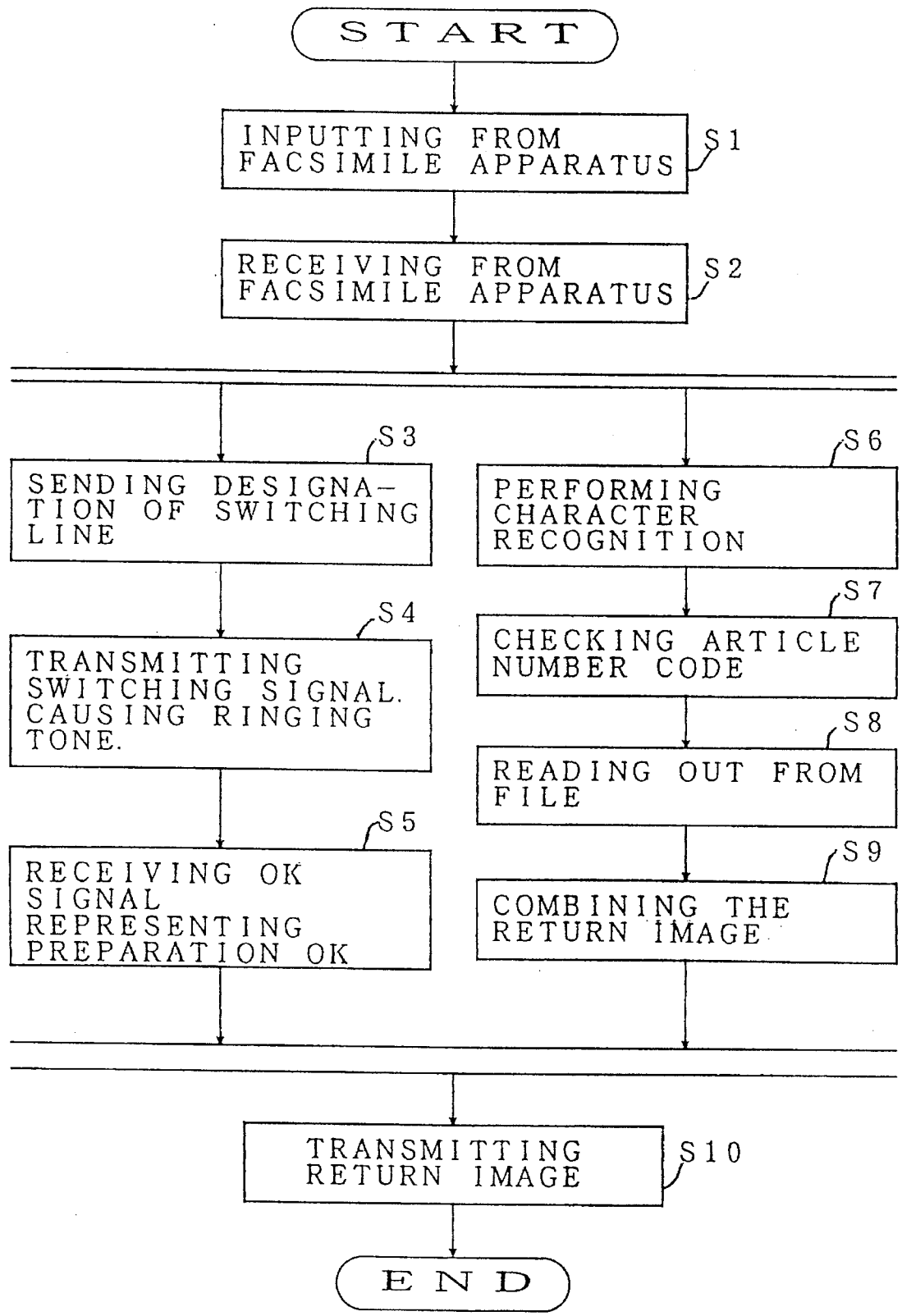
FIG. 5 shows a flowchart according to the first embodiment of the present invention.

An operation of the receiving apparatus 11 will be explained based on FIGS. 5 and 6.

In step S1, the user dials a number connecting the facsimile apparatus 21 to the receiving apparatus 11 provided by the center side through a public line network 23 and performs an input (entry) by transmitting the order slip. Upon the transmission of the order slip, the user pushes a button for conversation reservation in the facsimile apparatus 21 at the input source, in order to maintain the state of the line after completion of transmission.

The conversation reservation is set by pushing the button for the conversation reservation and is maintained as a signal in the register in the facsimile apparatus at the input source without producing any action. When EOP (end of procedure) signal is returned from the center side after completion of data transmission from the facsimile apparatus 21, the conversation reservation signal is transmitted from the user side to the center side.

In step S2, the facsimile receiving unit 20 in the receiving apparatus 11 receives the slip order from the facsimile apparatus 21 from which the input is transmitted.

Figure 6:
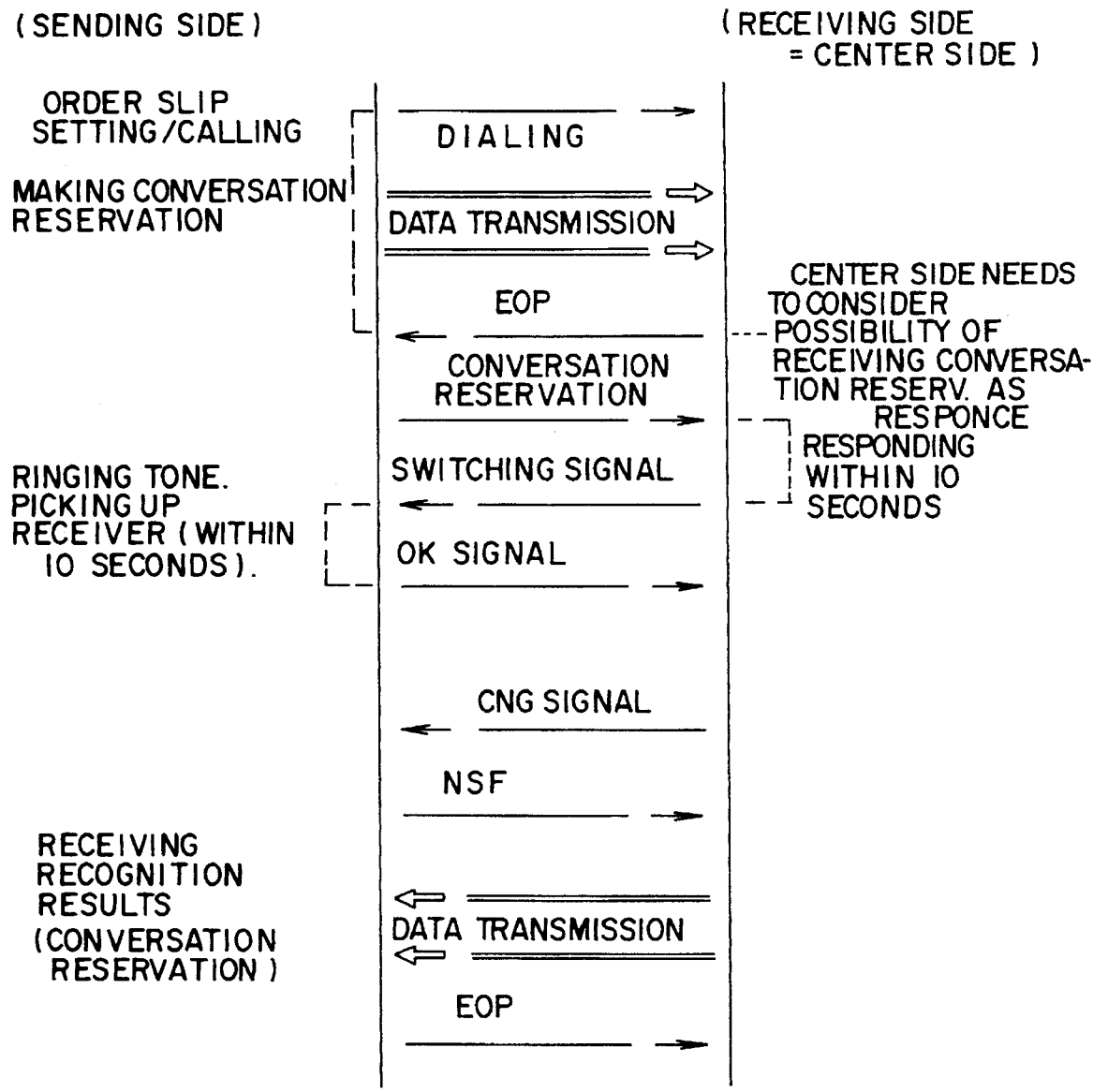
FIG. 6 shows a communication procedure according to the first embodiment of the present invention.

When the data transmission from the facsimile apparatus 21 is completed, the facsimile receiving unit 20 in the receiving apparatus 11 transmits an EOP signal to the facsimile apparatus 21 as shown in FIG. 6. The above operation is performed based on a communication protocol defined by facsimile G3.

When the reservation of the conversation is provided, the conversation reservation signal is transmitted from the facsimile apparatus 21 of the input source to the receiving apparatus 11 after receiving apparatus 11 transmits the EOP signal.

In step S3, within-a-single-call information return designating unit 80 in the sequence control unit 40 in receiving apparatus 11, sends a designation to an exchange 10 through a signal line 41 so that the exchange 10 can switch a line from the facsimile receiving unit 20 to facsimile transmitting unit 30 when the receiving apparatus 11 receives the conversation reservation (telephone reservation) signal from the facsimile apparatus 21, at the input source.

In step S4, a switching signal is transmitted automatically to the facsimile apparatus 21 through the facsimile transmitting unit 30 within ten seconds (usually, the switching signal is processed within one second). The switching signal is processed to the facsimile apparatus 21 and telephone 22 on the receiving side, thereby causing a ringing tone.

The conventional facsimile apparatus produces a switching signal to switch a line from a receiving state to a transmitting state only when a personnel picks up the telephone receiver, i.e., only through manual operation. According to the embodiment of the present invention the input receiving apparatus 11 on the center side can produce a switching signal automatically, i.e., without going through manual operation, by creating the same circuit state as when the telephone receiver is picked up based on the receipt of the conversation reservation signal by center side. For example, when the input receiving apparatus receives the conversation reservation signal, a microprocessor provided in a sequence control unit produces a signal resembling a signal produced when the telephone receiver is picked up, by using a conversion table provided in the microprocessor.

In parallel with the steps S3 through to the later-described S5, the within-a-single-call information return designating unit 80 in the sequential control unit 40 transmits the order slip image data received from the facsimile receiving unit 20 to the character recognizing unit 60. In step S6, the character recognizing unit 60 performs character recognition in accordance with the order slip format data, namely, based on the recognition position at which a character to be recognized is provided in the order slip. The order slip includes about 20 characters and the character recognition unit 60 completes the character recognition within a second. For example, the character recognition unit 60 completes the process within a second in the case where the recognizing character unit 60 has a character recognition capability of more than 200 characters per second.

When character recognition unit 60 performs the recognition for the received image data, it is sometimes considered that a plurality of recognition candidates exists when characters written on the order slip are not clear. It is necessary to determine from among a plurality of recognition candidates which is the right recognition result.

In step 7 an article code checking unit 15 checks whether any of the plurality of recognition candidates are included in a predetermined article code, as some of the recognition candidates written in an unclear manner are not included in the predetermined article code.

In step S8, the determining image forming unit 90 in the editing unit 50 reads the order slip format from the file 17, and in step S8, the order slip format is combined with the character recognition result obtained by the character recognition unit 60 and the combination is transmitted as the image data to the facsimile transmitting unit 30. It is possible to complete the process within three seconds, starting with the transmission of the image data to the character recognition unit 60 in step S6 and ending with the transmission of the return image combined by the return image forming unit 90 to the facsimile transmitting unit 30 in step S9.

As shown in FIG. 6, it takes actually 10 seconds from the output of the EOP signal from the receiving apparatus 11 (center side) to the signal transmission from the receiving apparatus 11, and therefore it is possible to complete the operation of the image of the character recognition and order slip format as recited in step S6 to steps S8 during the above stated period.

The image data (which is the facsimile image information to which the recognition result is inserted) prepared by the receiving image forming unit 90 is filed temporarily in the internal memory in the control apparatus.

As shown in FIG. 6, after the facsimile apparatus 21 at the input source produces a ringing in accordance with a switching signal transmitted from the facsimile transmitting unit 30 in the receiving apparatus 11 in step S4, when the user picks up the receiver within 10 seconds, the receiving apparatus 11 receives an OK signal representing that the preparation is OK in step S5. Further, when the facsimile receiving unit 20 in the receiving apparatus 11 receives the OK signal, the within-a-single-call information return designating unit 80 transmits a facsimile automatic transmission signal (calling tone signal, hereinafter, CNG signal) from the switched facsimile transmitting unit 30. When the facsimile apparatus 21 returns the receiving signal (nonstandard facilities signal, hereinafter, NSF signal), the within-a-single-call information return designating unit 80 returns the return image (order slip of the reading result) to the facsimile apparatus 21 at the input source in step S10.

When the conversation reservation is made, the connection state is further extended. When the conversation reservation is not made, the line is disconnected.

The above communication procedure is carried out in accordance with facsimile G3 sequence.

The facsimile receiving unit 20 and the facsimile transmitting unit 30 can be realized by using the facsimile adapter which is available on the market.

The control apparatus 12 comprises the level used for an office computer.

Figure 7:
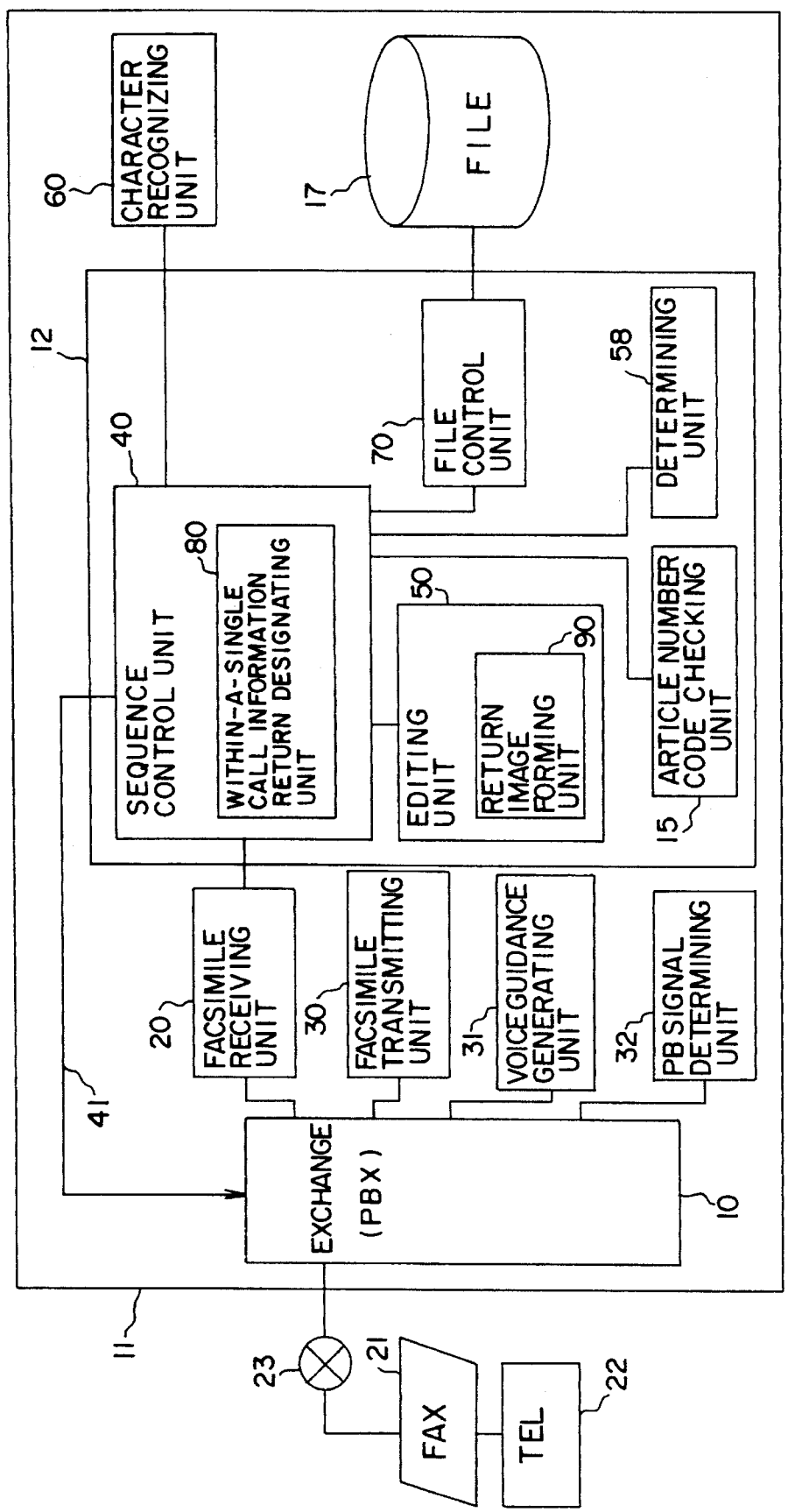
FIG. 7 shows a block diagram of the second embodiment of the present invention.

FIG. 7 shows the input receiving apparatus by using the facsimile apparatus according to the second embodiment of the present invention. The same reference numbers as the first embodiment shown in FIG. 4, have the same operation as in the first embodiment.

As shown in FIG. 7, the receiving apparatus 11 in the present embodiment is connected to facsimile apparatus 21 and telephone 22 in a series, through the public line network 23.

As shown in FIG. 7, the receiving apparatus 11 is different from the input receiving apparatus 11 comprising of the facsimile apparatus according to the first embodiment. The receiving apparatus 11 further returns the return image to the facsimile apparatus 21 at the input source. Thereafter, when the facsimile apparatus 21 inputs the PB signal and the PB signal is determined by the PB signal determining unit 32, the PB signal by being received within the same call as the return image, the return image are returned to the facsimile apparatus at the input source. At that time, the receiving apparatus 11 generates voice guidance relating to the PB signal input from the facsimile apparatus and the voice guidance generating unit 31 transmits the voice guidance to the facsimile apparatus at the input source. The exchange (PBX) 10 corresponds to the connection switching unit for performing the switching between at least the facsimile receiving unit 20, the facsimile transmitting unit 30, the voice guidance unit 31 and the PB signal determining unit 32, thereby maintaining the line connection between the voice guidance generating unit 31 and the facsimile apparatus 21 at the input source. The receiving apparatus 11 further comprises of, the control apparatus 12 comprising of a CPU and a memory for performing control of various apparatuses.

Unlike the first embodiment, control apparatus 12 further comprises a sequence control unit 40 for designating at least transmission and receiving operations, and character recognition and preparation of the receiving image in the predetermined sequence; and the determining unit 58 for confirming that the user performs an input (entry), thereby allowing the user to input the client's password by using the PB signal input.

Sequence control unit 40 is provided with the within-a-single-call information return designation unit 80 for instructing the connection switching unit 10 to switch the connection to the facsimile transmitting unit 30 and to return the prepared receiving image through the facsimile transmitting unit 30.

Figure 8:
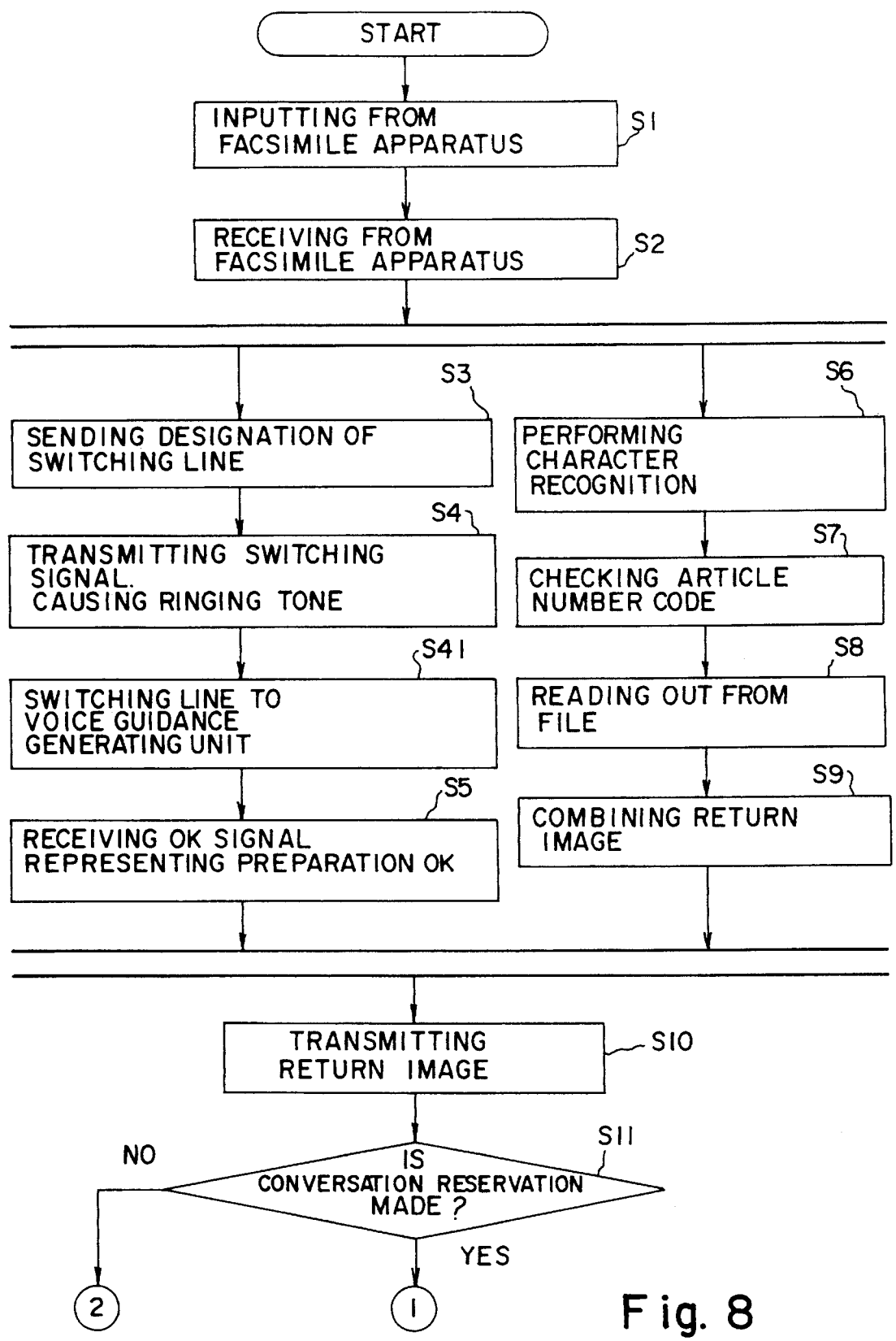
FIG. 8 shows a flowchart (1) according to the second embodiment of the present invention.
Figure 9:
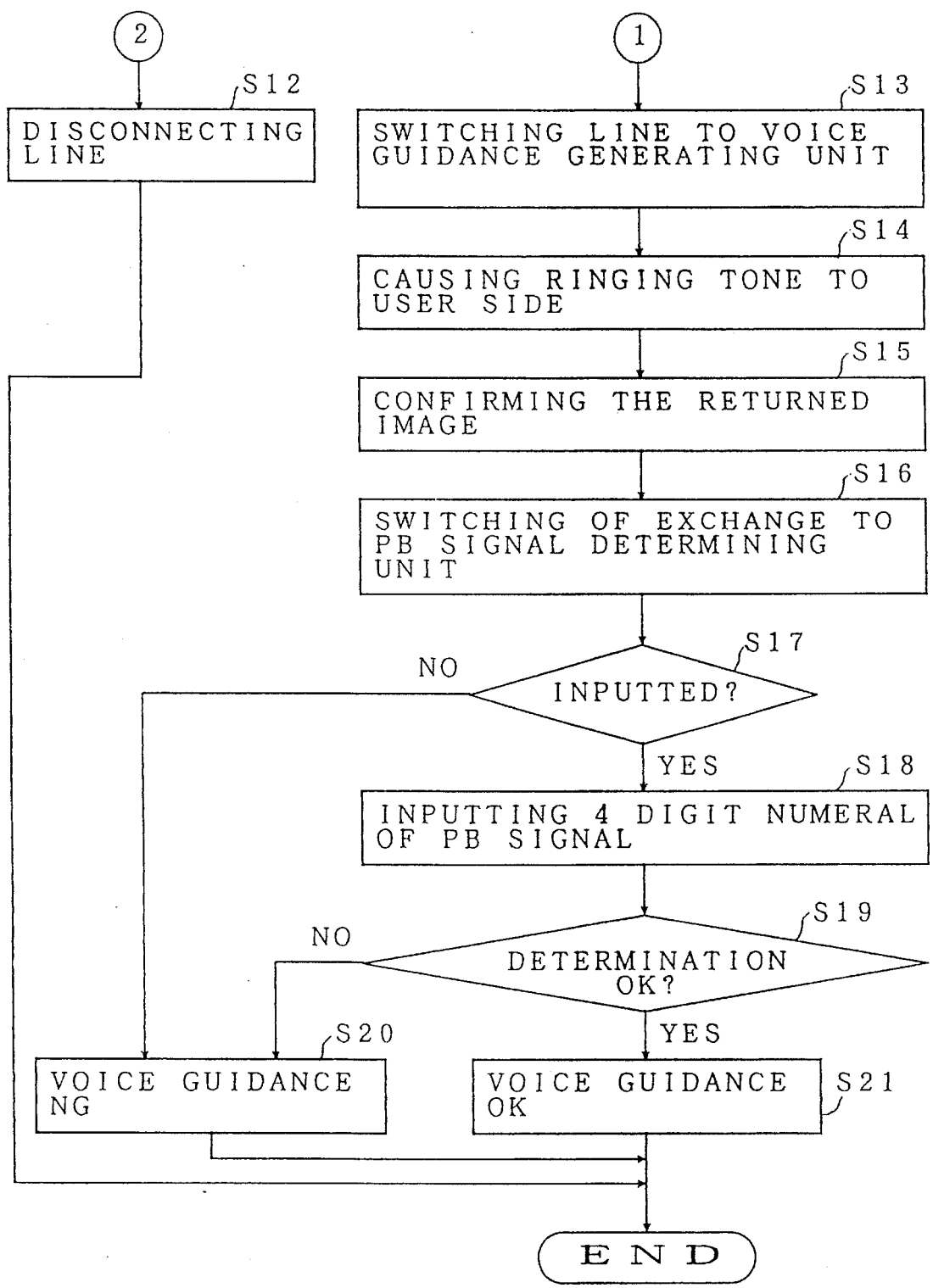
FIG. 9 shows a flowchart (2) according to the second embodiment of the present invention.
Figure 10:
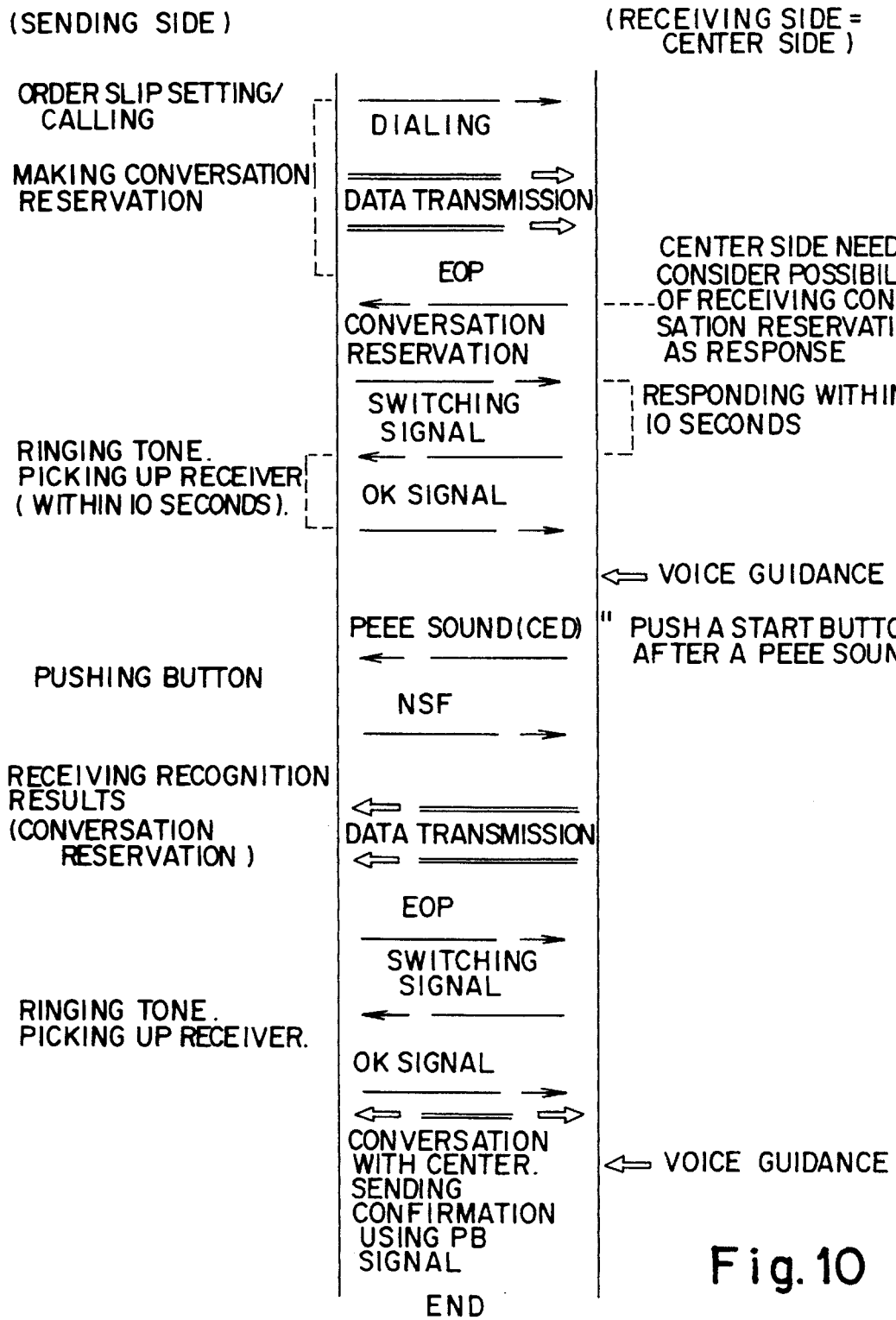
FIG. 10 shows a communication procedure according to the second embodiment of the present invention.

Sequentially, the processing operations of the receiving apparatus 11 according to the second embodiment are explained by referring to FIG. 8, 9 and 10.

In steps S1 and step S2, the slip-like memorandum issued by the facsimile apparatus 21 at the input source is received by the facsimile receiving unit 20 in the receiving apparatus 11, thereby performing an input (entry) and at this time, the conversation reservation is made for maintaining the line connection after completion of the transmission of the order slip, as in the first embodiment.

When a within-a-single-call information return designating unit 80 in the sequence control unit 40 in the receiving apparatus 11 receives the conversation reservation signal from the facsimile apparatus 21 at the input source, it sends an instruction to the exchange 10 forming the connection switching unit through the signal line 41 to enable the facsimile transmitting unit 30 to be connected with the line, as in the first embodiment in step S3. The within-a-single-call information return designation unit 80 automatically transmits a switching signal to the facsimile apparatus 21 which then travels to the facsimile transmitting unit 30, thereby enabling the telephone 22 to ring; and in parallel, sends the received image data to the character recognition unit 60 in step S4.

Thereafter, as shown in FIG. 10, when the OK signal is received after a ringing tone in response to the switching signal in step S4 is made, according to the present embodiment, the within-a-single-call information return designating unit 80 switches a line to the voice guidance generating unit 31, so that the voice guidance generating unit 31 is connected to the exchange 10 in step S41. Therefore, the guidance relating to the next process is transmitted to the user as a voice through the line.

As shown in FIG. 10, after the receiving apparatus 11 gives the instruction "push the start button after a peee sound"; the receiving apparatus 11 switches a connection of the exchange 10 to the facsimile transmitting unit 30, thereby enabling a peee sound (called station identification, hereinafter, CED) to be outputted from the center side in step S41. In step S5, like the first embodiment, when the receiving apparatus 11 receive the receiving possible signal (NSF) from the facsimile apparatus 21 at the input source, in step S10, the receiving apparatus 11 transmits the return image (facsimile image information) to which the recognition result is inserted, through the facsimile transmitting unit 30.

In parallel with step S3 to S5, in steps S6 to S8, the return image is prepared by the return image forming unit 90 after the recognition of the characters.

In step S10 to S11, the facsimile apparatus 21 at the input source on the user side can be prepared or set so that the button for the conversation reservation is pushed during the period of receiving the return image, to enable the connection to be maintained after completion of the receipt.

The facsimile communication sequence (an exchange of a command) is performed in accordance with G3 facsimile sequence of CCITT recommendation T.30.

When the conversation reservation is not made in step S11, the process proceeds to step S12 enables the line to be disconnected.

When the conversation reservation is made in step S11, the process proceeds to step S13 after the facsimile apparatus 21 at the input source sends an EOP signal to the center side. The sequence control unit 40 switches the exchange 10 of the connection switching unit to the facsimile transmitting unit 30 to transmit the switching signal, thereby enabling the telephone 22, connected to facsimile apparatus 21, to produce a ringing sound. Then the facsimile apparatus 21 side takes up the receiver and the receiving apparatus 11 receives the OK signal. In this case, as shown in step S14 to S15, the line is switched to the voice guidance generating unit 31 and the center side of the receiving apparatus 11 sends a guidance to the user side so that the user confirms the returned image.

In step S16, the exchange 10 is instructed to be switched to the PB signal determining unit 40 through the signal line 41 so that the PB signal determining unit 40 waits for the input of the PB signal from the facsimile apparatus 21 at the input source.

In step S17, when the PB signal is judged to have been inputted, the process advances to step S18 before the completion of the communication with the center and the user inputs the PB signal (a 4 digit numeral). It is confirmed that the user possesses a contract with the center. In the case of the order utilizing credit, the pass word number which is registered by the credit company as the result of the contract is inputted.

In step S19, the determining unit 80 performs the determination. A contractor with the center is referred to the number registered in the determining unit 80. When the input number matches the registered number, in step S21 the contractor is notified by the voice through the voice guidance, that the input of the password number has been duly received by the receiving apparatus 11.

In case where the result of the reference is NG, the process advances to S20. The NG is notified to the user through the voice guidance generating unit 31 and the input is reminded again. Even if the user tries to input several times, the NG is called and the communication is then stopped, since the user is treated as not being a legitimate user having a contract with the center.

In the case of ordering by credit, the control device 12 is connected to a line of the computer of the credit company and performs the reference of the password number of the credit card number. The determining unit 58 checks the password number and the user to determine whether the user is a legitimate person having a contract with the center.

As described above, in the second embodiment, a guidance is provided to the user in the form of a voice through the voice guidance and thus the user can confirm the content of the return information in response to the input with certainty and high accuracy.

Further, as the user confirms the content of the communication, the data entry transaction can be completed within a predetermined time, and further, line fees can be charged to the user.

A slip information transmitted by the user (facsimile calling person) is read into the facsimile on the side of the user by using the same line. Thus, it is apparent that an error in distribution or transmission from the center does not happen and no person other than the user can receive the returned information slip, thereby increasing security and safety to a great extent.

As the user can send a confirmation, acknowledged password, using the PB signal in accordance with the voice guidance from the center to the same line, the security is further enhanced. The fee charged on the line is paid by the user, thus the cost management on the sales side can be conducted more effectively in the case of communication sales in which many un-specified people can be subject to action or sales activity.

Therefore, the cost management concerning the communication expense can be made with great simplicity.

As described above, the present invention returns the information in response to the input to the receiving apparatus from the facsimile apparatus by maintaining connection of the line with the facsimile apparatus at the input source.

Therefore, the input, character recognition, recognition result return and content confirmation, for example, can be continuously conducted with the connected line within a very short time, with high reliability. Further the input receiving apparatus, by using the facsimile apparatus according to the present invention, enables the user to pay a communication expense for an input and information return, for example.

What is claimed is:

1. A receiving apparatus for receiving an input from a facsimile apparatus and for returning information to the facsimile apparatus, comprising:

a facsimile receiving means for receiving the input from the facsimile apparatus;

a character recognizing means for recognizing a character included in the received image data;

return image forming means for forming a return image based on the recognition result obtained by said character recognizing means;

a facsimile transmitting means for transmitting a switching signal and the return image to the facsimile apparatus;

connection switching means, operably coupled to said facsimile receiving means and facsimile transmitting means, for performing switching between said facsimile receiving means and facsimile transmitting means by maintaining a line connection state between the facsimile receiving apparatus and the facsimile apparatus at the input source; and control means for designating operation of said facsimile receiving means, character recognizing means, a return image forming means and facsimile transmitting means in a predetermined sequence, wherein said control means comprises a within-a-single-call information return designating means for instructing said connection switching means to perform switching of a connection and instructing said facsimile transmitting means to transmit the switching signal to the facsimile apparatus when the facsimile receiving apparatus receives a request signal designating a maintenance of the line connection state.

2. The receiving apparatus according to claim 1, wherein said within-a-single-call information return designating means instructs said connection switching means to switch a line from said fascimile receiving means to said facsimile transmitting means and the facsimile transmitting means to return a return information to the facsimile apparatus within-a-single-call wherein the transmission from the facsimile apparatus is returned when the receiving apparatus receives a conversation reservation signal after completion of the receipt of the input.

3. The receiving apparatus according to claim 2, further comprising a voice guidance generating means for transmitting a guidance before an information return is transmitted.

4. The receiving apparatus according to claim 3, wherein said voices guidance generating means provides for transmitting a guidance after the information return is transmitted.

5. The receiving apparatus according to claim 2, further comprising a push button signal determining means for determining the push button signal inputted by the facsimile apparatus at the input source.

6. The receiving apparatus according to claim 2, wherein said within-a-single-call information return designating means instructs said collection switching means to switch the facsimile receiving means to the facsimile transmitting means when the receiving apparatus receives a conversation reservation signal after completion of the receipt of the return information by the facsimile apparatus.

7. The receiving apparatus according to claim 1, further comprising a file means for filing a plurality of image data and wherein said return image forming means selects image data from said file means based on the recognition result of the character recognizing means.

8. The receiving apparatus according to claim 1, further comprising a code number checking means for restricting a plurality of recognition candidates obtained by the character recognizing means to the limited number by checking the code number of recognition candidates.

9. The receiving apparatus according to claim 1, wherein the image data inputted by the facsimile apparatus at the input source is written in a predetermined format.

10. A receiving apparatus for receiving an input from a facsimile apparatus and for return information to the facsimile apparatus, comprising:

a facsimile receiving means for receiving the input from the facsimile apparatus;

a character recognizing means for recognizing a character included in the received image data;

return image forming means for forming a return image based on the recognition result obtained by said character recognizing means;

a facsimile transmitting means for transmitting a switching signal and the return image to the facsimile apparatus;

connection switching means, operably coupled to the facsimile receiving means and the facsimile transmitting means, for performing switching between said facsimile receiving means and facsimile transmitting means by maintaining a line connection state between the facsimile receiving apparatus and the facsimile apparatus at the input source; and control means for designating operation of said facsimile receiving means, character recognizing means, a return image forming means and facsimile transmitting means in a predetermined sequence, wherein said control means comprises a within-a-single-call information return designating means for instructing said connection switching means to perform switching of a connection, wherein said within-a-single-call information return designating means instructs said connection switching means to switch a line from said facsimile receiving means to said facsimile transmitting means and the facsimile transmitting means to return a return information to the facsimile apparatus within-a-single-call, wherein the transmission from the facsimile apparatus is returned when the receiving apparatus receives a conversation reservation signal after completion of the receipt of the input, and wherein said within-a-single-call information return designating means instructs said collection switching means to switch the facsimile receiving means to the facsimile transmitting means when the receiving apparatus receives a conversation reservation signal after completion of the receipt of the return information by the facsimile apparatus.

11. A receiving apparatus for receiving an input from a facsimile apparatus and for return information to the facsimile apparatus, comprising:

a facsimile receiving means for receiving the input from the facsimile apparatus;

a character recognizing means for recognizing a character included in the received image data;

return image forming means for forming a return image based on the recognition result obtained by said character recognizing means;

a facsimile transmitting means for transmitting a switching signal and the return image to the facsimile apparatus;

connection switching means, operably coupled to the facsimile receiving means and the facsimile transmitting means, for performing switching between said facsimile receiving means and facsimile transmitting means by maintaining a line connection state between the facsimile receiving apparatus and the facsimile apparatus at the input source;

control means for designating operation of said facsimile receiving means, character recognizing means, a return image forming means and facsimile transmitting means in a predetermined sequence; and a code number checking means for restricting a plurality of recognition candidates obtained by the character recognizing means to the limited number by checking the code number of recognition candidates, wherein said control means comprises a within-a-single-call information return designating means for instructing said connection switching means to perform switching of a connection.

* * * * *